United States Patent
Hartmann et al.

(10) Patent No.: US 9,444,362 B2
(45) Date of Patent: Sep. 13, 2016

(54) RECTIFIER CIRCUIT WITH CURRENT INJECTION

(71) Applicant: Schneider Electric Power Drives GmbH, Vienna (AT)

(72) Inventors: Michael Hartmann, Vienna (AT); Rudolf Fehringer, Vienna (AT)

(73) Assignee: Schneider Electric Power Drives GmbH, Vienna (AT)

( * ) Notice: Subject to any disclaimer, the term of this patent is extended or adjusted under 35 U.S.C. 154(b) by 164 days.

(21) Appl. No.: 14/382,726

(22) PCT Filed: Feb. 22, 2013

(86) PCT No.: PCT/EP2013/053532
§ 371 (c)(1),
(2) Date: Sep. 3, 2014

(87) PCT Pub. No.: WO2013/143793
PCT Pub. Date: Oct. 3, 2013

(65) Prior Publication Data
US 2015/0029771 A1    Jan. 29, 2015

(30) Foreign Application Priority Data

Mar. 30, 2012 (AT) ..................................... 387/2012

(51) Int. Cl.
*H02M 7/219* (2006.01)
*H02M 7/06* (2006.01)
(Continued)

(52) U.S. Cl.
CPC ............. *H02M 7/06* (2013.01); *H02M 1/4216* (2013.01); *H02M 7/219* (2013.01); *H02M 7/2176* (2013.01); *Y02B 70/126* (2013.01)

(58) Field of Classification Search
CPC .. H02M 1/4216; H02M 7/2176; H02M 7/06; H02M 7/062; H02M 7/066; H02M 7/21; H02M 7/217; H02M 7/219
See application file for complete search history.

(56) References Cited

U.S. PATENT DOCUMENTS 5,621,634 A   4/1997  Sato
5,719,757 A * 2/1998  Beyerlein ........... H02M 1/4216
                                                    323/211
(Continued)

FOREIGN PATENT DOCUMENTS

EP    1 953 907 A1   8/2008
FR    2922382 A1     4/2009
SU    1328904 A1     8/1987

OTHER PUBLICATIONS

J-Itoh et al: "A Novel three-Phase PFC Rectifier Using a Harmonic Current Injection Method", IEEE Transactions on Power Electronics, IEEE Service Center, Piscataway, NJ, US, vol. 23, No. 2, Mar. 1, 2008, pates 715-722.

(Continued)

*Primary Examiner* — Harry Behm
(74) *Attorney, Agent, or Firm* — Collard & Roe, P.C.

(57) ABSTRACT

The present invention relates to a rectifier circuit with a three-phase rectifier arrangement (1) of semiconductor valves (2), preferably a bridge rectifier circuit of diodes, wherein the rectifier arrangement (1) comprises a three-phase mains input (3) and a DC output (4), and at least one of the three phases (U, V, W) at the mains input (3) is connected to a first pole connection (A) of a three-pole circuit (5) for diverting an injection current ($i_{h3}$) into the three-pole circuit (5). It is provided in accordance with the invention that each phase (U, V, W) can respectively be connected with a switching element ($S_1$, $S_2$, $S_3$) to the first pole connection (A) of the three-pole circuit (5), and a second and third pole connection (B, C) of the three-pole circuit (5) is respectively connected to an output line ($P_{DC}$, $N_{DC}$) of the DC output (4) for control currents ($i_{cp}, i_{cn}$), wherein the three-pole circuit (5) comprises controllable semiconductor valves ($S_{cp+}, S_{cp-}, S_{cn+}, S_{cn-}$), preferably IGBTs, for the active control of the control currents ($i_{cp}, i_{cn}$) and/or the injection current ($i_{h3}$), and at least one choke (7) is arranged on one of the output lines ($P_{DC}, N_{DC}$) at the DC output (4), and a time-variable load (6) is provided at the DC output (4).

23 Claims, 5 Drawing Sheets

(51) Int. Cl.
*H02M 1/42* (2007.01)
*H02M 7/217* (2006.01)

(56) References Cited

U.S. PATENT DOCUMENTS

| | | | |
|---|---|---|---|
| 5,784,269 A | 7/1998 | Jacobs et al. | |
| 5,936,855 A * | 8/1999 | Salmon | H02M 1/4216 363/46 |
| 6,046,915 A * | 4/2000 | Jacobs | H02M 1/4216 323/217 |
| 6,278,626 B1 | 8/2001 | Teichmann | |
| 2004/0160789 A1 | 8/2004 | Ying et al. | |
| 2008/0219036 A1* | 9/2008 | Colombi | H02J 9/062 363/126 |

OTHER PUBLICATIONS

Hyunjae Yoo et al: A New Circuit Design and Control to Reduce Input Harmonic Current for a Three-phase AC Machine Drive System having a very Small DC-link Capacitor, Applied Power Electronics Conference and Exposition (APEC), 2010 Twenty-Fifth Annual IEEE, IEEE, Piscataway, NJ, USA, Feb. 21, 2010, pp. 611-618.

Kim S. et al: "A New Approach to Improve Power Factor and Reduce Harmonics in a Three Phase Diode Rectifier Type Utility Interface", Industry Applications Society Annual Meeting, 1993., Conference Record of the 1993 IEEE Toronto, Ont., Canada Oct. 2-8, 1993, New York, NY, USA, IEEE, US, Oct. 2, 1993, pp. 993-1000.

Chung-Chuan Hou: "An AC/DC Power System Consisting of a Diode Rectifier and an Auxiliary Three-Level Converter"; 8th 9, 18-26 International Conference on Power Electronics and ECCE Asia; Jun. 3, 2011, pp. 2087-2091.

International Search Report of PCT/EP2013/053532, mailed Jan. 31, 2014, 3 pages.

Austrian Search Report dated Nov. 26, 2012 in Austrian Application No. A 387/2012 with English translation of relevant parts, 2 pages.

* cited by examiner

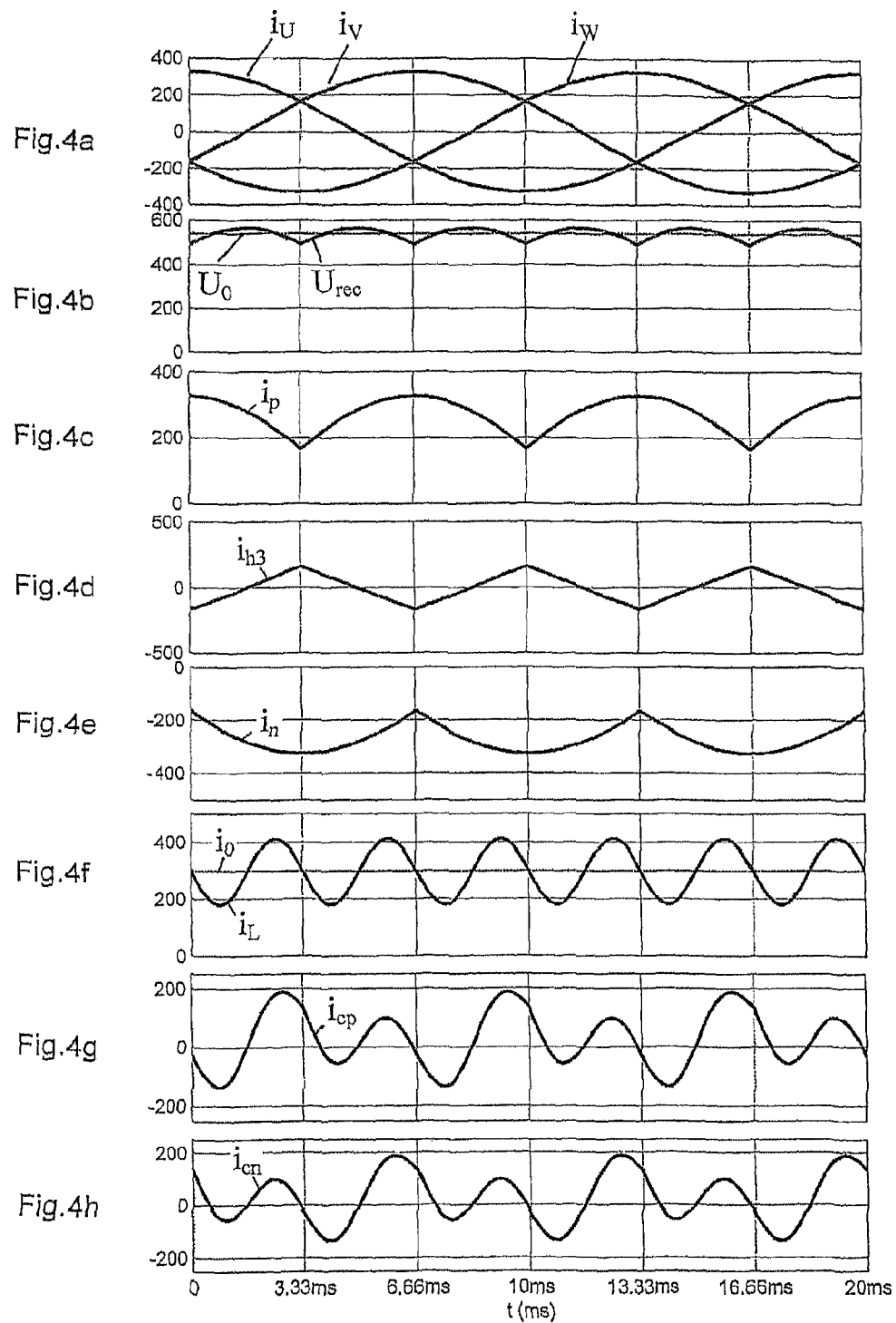

US 9,444,362 B2

RECTIFIER CIRCUIT WITH CURRENT INJECTION

CROSS REFERENCE TO RELATED APPLICATIONS

This application is the National Stage of PCT/EP2013/053532 filed on Feb. 22, 2013, which claims priorty under 35 U.S.C. §119 of Austrian Application No. A 387/2012 filed on Mar. 30, 2012, the disclosure of which is incorporated by reference. The international application under PCT article 21(2) was not published in English.

BACKGROUND OF THE INVENTION

The present invention relates to a rectifier circuit with a three-phase rectifier arrangement of rectifier valves, preferably a bridge rectifier circuit of diodes, wherein said rectifier arrangement comprises a three-phase mains input and a DC output, and at least one of the three phases at the mains input is connected to a first pole connection of a three-pole circuit for diverting an injection current into the three-pole circuit, according to the preamble of claim 1.

The present invention further relates to a method for the impression of control currents into a DC output of a rectifier circuit with a three-phase rectifier arrangement of semiconductor valves, preferably a three-pole bridge rectifier circuit of diodes, wherein an injection current is diverted from at least one of the three phases to a mains input of the rectifier circuit, according to the preamble of claim 18.

DESCRIPTION OF THE PRIOR ART

In modern power electronics, a large number of different embodiments of passive, active and mixed forms, so-called hybrid rectifier circuits, are known. The various rectifier circuits substantially provide from sinusoidal mains voltages at the input a DC voltage which is as constant as possible at the output of the rectifier circuit. A frequently used rectifier arrangement is represented by the three-phase (six-pulse) bridge rectifier arrangement (B6 circuit) of rectifier diodes, which is known from the state of the art, especially from power electronics. A rectified voltage is produced after the bridge arrangement (the so-called direct current side of the rectifier circuit) from a three-phase mains system (the so-called alternating current side of the rectifier circuit) by means of a bridge arrangement of diodes.

For the purpose of reducing the pulse-like currents at the AC input of the rectifier which are produced by the rectifier circuit and for smoothing the rectifier output voltage or the rectifier output current, inductors (chokes) on the DC voltage side are frequently switched between the rectifier output of the diode bridge and the output capacitor. In the case of generic rectifier circuits, the rectifier current is guided through a choke, which is connected to an output capacitor parallel to the output, in order to reduce distortions in the mains currents and to smooth the flow of the rectifier current and to provide a constant output voltage at the output or to the output capacitor.

The mains flow of current of a rectifier circuit with switching elements, inductors and/or capacitors, which is also provided in operation with a passive (ohmic) load or a further electronic circuit on the DC voltage side, is not conventionally sinusoidal. The non-sinusoidal currents produce undesirable mains voltage or current distortions as a result of their harmonic content and the phase displacement in relation to the system fundamental oscillation. Such system perturbation cannot be disregarded, especially in the case of rectifier circuits of higher power. It is necessary to maintain a level of the summed power of all harmonic components in relation to the power of the fundamental component (THDi, which stands for "Total Harmonic Distortion of currents"), wherein the maximum distortions of the mains current and mains voltages is predetermined by standards (e.g. IEC61000-3-2).

It is known from the state of the art that the current waveforms of the rectifier circuit can be influenced by adding or diverting currents, the so-called injection currents. Currents are preferably impressed into the currentless phases of the diode bridge currents by additionally arranged switching elements. The current required for this purpose substantially has a triple frequency in relation to the system frequency, as a result of which this type of injection is referred to in literature as third harmonic current injection for the purpose of improving the system perturbations produced by the rectifier circuit. Reference is made hereby to the so-called Minnesota rectifier as the best known representative of such a rectifier system and the state of the art.

The rectifier structure which is known in the state of the art as the Minnesota rectifier uses an injection of a current with a third harmonic of the system frequency simultaneously into all three phases of the DC connection of the rectifier circuit in order to achieve approximately sinusoidal mains currents of the rectifier circuit. This fills such current gaps which would not conduct any current due to the blocking effect of the rectifier arrangement at the mains input. As a result of the suitable selection of the injection current, the distortion of the mains currents can thus be substantially prevented and better THDi can be achieved.

The circuit of the Minnesota rectifier shows the relevant disadvantage that the currents necessary for this purpose need to be impressed simultaneously in all three phases and injection transformers loaded at low frequency need to be used in this process, which have a large volume and also a high weight as a result of the low-frequency loading with the third harmonic of the system frequency. The generation of the injection current is produced in the circuit of the Minnesota rectifier by two step-up converters arranged on the DC side. A controlled output voltage, which is filtered by a sufficiently large output capacitor, can thus be provided. The application of the step-up converter on the DC side of the rectifier leads to the insertion of two diodes in the primary power flow of the rectifier circuit however, which leads to a considerable reduction in the efficiency, especially in the high power ranges. A selective impression of the required injection current is only possible into the phase on the AC side which would remain currentless in classic six-pulse rectifier operation, but requires additional active switches for selection of the respective phase. It is necessary to adjust the injection current of the rectifier circuit for this purpose. Such an operation is not possible with the topology of the Minnesota rectifier.

Other rectifier circuits known from the state of the art which use the concept of third harmonic injection can only be operated parallel to the load of the rectifier circuit and without using the choke on the DC side or without using any noteworthy output capacitor. In the case of such existing circuits, both the pulsating output voltage of the bridge rectifier and also a constant-power load, i.e. a load which takes up the required power independent of the voltages that are made available, are required in order to obtain an approximately sinusoidal current. Rectifier circuits with technically advantageous choke and capacitor at the DC output can therefore not be used. A sufficiently good smoothing and support of the output voltage and therefore a sufficiently large output capacitor are mandatory for the operation of many power-electronic circuits. Topologies of this kind can therefore not be used in such applications.

A relevant rectification which is as optimal as possible in combination with simultaneously avoiding mains distortions is therefore not provided in rectifier circuits with current injection as known from the state of the art.

SUMMARY OF THE INVENTION

It is therefore the object of the present invention to avoid these disadvantages and to improve a rectifier circuit with current injection and a method for impressing control currents in such a way that low system perturbations occur in the rectifier circuit, wherein an input current which is as sinusoidal as possible is to be present in phase with the respective mains voltages, no large magnetic components are required at the AC voltage side of the rectifier circuit, no large filter capacitors arranged on the AC voltage or DC voltage sides are required, and the efficiency of the rectifier circuit is improved.

DESCRIPTION OF THE INVENTION

These objects are achieved by the features of claim 1 and claim 18.

Claim 1 relates to a rectifier circuit with a three-phase rectifier arrangement of semiconductor valves, preferably a bridge rectifier circuit of diodes, wherein the rectifier arrangement comprises a three-phase mains input and a DC output, and at least one of three phases on the mains input is connected at the mains input to a first pole connection of a three-pole circuit for diverting an injection current into the three-pole circuit. It is provided in accordance with the invention that each phase can respectively be connected with a switching element to the first pole connection of the three-pole circuit, and a second and third pole connection of the three-pole circuit is respectively connected to an output line of the DC output for control currents, wherein the three-pole circuit comprises controllable semiconductor valves, preferably IGBTs, for the active control of the control currents and/or the injection current, and at least one choke is arranged on one of the output lines at the DC output, and a load which can be changed over time is provided at the DC output.

The circuit in accordance with the invention comprises a three-pole circuit for impressing injection currents in addition to the known rectifier arrangement. Every single phase of the mains can be connected by means of a switching element to the three-pole circuit, wherein the so-called injection current is taken from the mains and is added to the rectifier currents as a control current. The circuit in accordance with the invention allows the operation with variable loads at the DC output of the rectifier circuit because the control currents from the three-pole circuit can be controlled by means of controllable semiconductor valves as active components for the active control in the three-pole circuit depending on the load. Passive components such as resistors, capacitors or inductors, as are used in conventional circuit topologies of rectifier circuits by using the injection principle, are not adequately suitable for this purpose. Controllable semiconductor valves in form of IGBTs with antiparallel freewheeling diodes are preferably provided as active components, wherein any kind of switched valves can be provided which can be used for controlling the switching states (e.g. MOSFETs, GTOs, . . . ). In the description of the present invention, controllable semiconductor valves shall be used in lieu of all controllable switching elements.

The use of a DC choke in combination with a sufficiently large output capacitor for maintaining rectified constant output voltages is possible without impairing the function of the rectifier circuit and producing high system perturbations. The entire power of the rectifier circuit is guided at the DC output through the choke. A voltage produced by the rectifier arrangement with alternating components can drop at the choke, wherein a rectified voltage remains at the output and can be supplied to the load. In particular, conventional rectifier circuits with choke and output capacitor can be expanded in a simple fashion by means of the three-pole circuit.

It is provided according to a further preferred embodiment of the invention that the second and third pole connection of the three-pole circuit are respectively connected via a second and third inductor to one of the two output lines of the DC output, and the choke is provided between the second and third pole connection and load.

A differential voltage on the inductors forms the basis for the control of the control currents and the injection current. The respective currents, i.e. the control currents and/or the injection current, are set by modulation of the active components in the three-pole circuit. The switching processes for the modulation of currents by means of active components are known in power electronics. The currents are smoothed by the inductors on the connections of the three-pole circuit and an impression of pulsed currents into the DC output can be avoided. Expensive filter capacitors with large capacitance values can thus be avoided, which would conventionally receive the pulsed currents which occur by the switching process of the active components. The choke at the DC output conducts both the rectifier currents and also the impressed control currents and ensures a continuous progression of the output quantities.

It is provided in a further preferred embodiment of the invention that the first pole connection is connected to the switching elements by a first inductor, wherein the three inductors are arranged by means of a three-leg choke. The arrangement of the three inductors by means of a conventional three-leg choke represents an especially compact and inexpensive variant that is easy to implement, wherein each leg winding of the three-leg choke forms an inductor.

It is provided according to a further embodiment of the rectifier circuit in accordance with the invention that the two output lines at the DC output are connected to an output capacitor. Said output capacitor is substantially used for maintaining a constant output voltage in cooperation with the choke, wherein an existing alternating component in the voltage loop between the choke and the output capacitor drops at the choke, and the output capacitor holds a constant rectified output voltage. An output capacitor parallel to the output connection of the rectifier circuit is also required among other things by the downstream operation of power-electronic circuits such as a three-phase inverter stage.

It is provided in a further preferred embodiment of the invention that each of the three phases is respectively connected at the mains input to a filter capacitor, wherein the filter capacitors are interconnected in a point-to-point manner in a star point. It is further provided that the three-pole circuit is connected via at least one bypass capacitor to the mains input. The bypass capacitor of the three-pole circuit forms an advantageous current path with the filter capacitors arranged point-to-point in order to divert currents which are produced by high high-frequency switching processes in the three-pole circuit.

It is further provided according to a further preferred embodiment of the invention that the three-pole circuit comprises three converter systems with controllable semiconductor valves and/or a bidirectional switch, wherein the first pole connection of the three-pole circuit is provided on a first converter system, the second pole connection of the three-pole circuit on a second converter system, and the third pole connection of the three-pole circuit on a third converter system, and a connection to a branching point (a common centre point of the three-pole circuit) is provided from all three converter systems.

The three converter systems are used in order to impress the two control currents and the injection current in the case of respective control. Each of the converter systems provides one degree of freedom for the control of the three currents, i.e. the two control currents and the injection current. The degrees of freedom can be utilised to control the control currents by means of the advantageous embodiment of controllable semiconductor valves and/or a bidirectional switch in a bridge structure.

It is further provided according to a preferred embodiment of the invention that the first converter system is provided as a three-level bridge leg, wherein the second and third converter system are provided as a half-bridge, and the three converter systems are arranged by means of three branches which are switched in parallel and are provided with electronic components, wherein the first pole connection of the three-pole circuit is arranged on a first branch, and the second and third pole connection are arranged on a third branch, and each branch comprises a centre point connection, wherein the components of the branches are arranged symmetrically around said centre point connections, and wherein a first centre point connection of the first branch is connected via a bidirectional switch to a second centre point connection of the second branch, and the second centre point connection is conductively connected in a direct manner to a third centre point connection of the third branch, wherein the third centre point connection is provided as the centre point of the three-pole circuit. The first converter system is arranged as a known three-level bridge leg, and can be provided unidirectionally or bidirectionally, as will be explained below in closer detail. The converter systems two and three consist of two half-bridges, but can also be arranged as a three-step or multi-step bridge leg.

The first pole connection is provided on the first branch and the injection current flows into the first centre point connection and thus into the three-pole circuit. The three branches which are thus switched in parallel jointly represent the three converter systems as bridge structures, with which bridge structures it is possible to control the control currents and the injection current.

It is alternatively provided according to a further preferred embodiment of the invention that the three-pole circuit comprises two converter systems with controllable semiconductor valves, preferably arranged in a bridge structure, wherein the second pole connection of the three-pole circuit is provided on a second converter system, and the third pole connection of the three-pole circuit is provided on a third converter system, and a connection to a branching point, a common centre point, is provided from both converter systems, and the centre point is connected to the first pole connection. According to this alternative embodiment of the invention, the first converter system is omitted and the first pole of the three-pole circuit is conductively connected directly to the centre point of the two remaining converter systems.

It is provided according to a further preferred embodiment of the invention that the second and third converter system are provided as a half-bridge, wherein the two converter systems are arranged by means of two branches switched in parallel, and the first pole connection of the three-pole circuit is connected to a second branch, and the second and third pole connection are arranged on a third branch, and each of the branches comprises a centre point connection, wherein the components of the branches are arranged symmetrically around said centre point connections, and a second centre point connection of the second branch is directly conductively connected to a third centre point connection of the third branch, wherein the third centre point connection is provided as the centre point of the three-pole circuit. According to this embodiment of the three-pole circuit, no first branch is provided which is connected by means of switches, but only an embodiment with two half-bridges as converter systems, thus providing two degrees of freedom for controlling the voltage and current quantities of the bridge structures. The direct connection of the first pole of three-pole circuit to the centre point of the three-pole circuit and thus the two converter systems defines the potential at this point, and both the two control currents and also the injection current can be controlled by the two remaining converter systems.

For the purpose of component assembly of the branches, it is provided according to a further preferred embodiment that two buffer capacitors are switched in series on the second branch, wherein the second centre point connection is arranged between the two buffer capacitors. It is further provided according to a preferred embodiment that two bridge valves, preferably diodes, are switched in the first branch in series with the same conducting direction, wherein the first centre point connection is arranged between the two bridge valves. Such an arrangement of diodes means a unidirectional arrangement of the first converter system. A unidirectional arrangement of the first converter system allows conducting current in only one direction as a result of the diodes, by means of which power transfer from the mains to the three-pole circuit is determined. It is provided according to a further preferred embodiment that the two bridge valves are arranged as controllable semiconductor valves, preferably IGBTs. Such an arrangement of controllable semiconductor valves instead of diodes means a bidirectional arrangement of the first converter system. A bidirectional arrangement of the first converter system allows minimising the voltage at the buffer capacitors in the case of suitable control of the three converter systems since the required currents in the three-pole circuit are no longer limited by the direction of flow of the bridge valves of the first converter system. As a result, the maximum voltage of the buffer capacitors can be reduced advantageously.

It is provided according to a further preferred embodiment that the four controllable semiconductor valves are switched in series on the third branch, wherein the centre point of the three-pole circuit is arranged in the connection between two pairs of the controllable semiconductor valves which are switched in series, and the second pole connection is provided between the controllable semiconductor valves of the first pair, and the third pole connection is provided between the controllable semiconductor valves of the second pair. The control currents flow into the DC output lines at these pole connections. The respective control currents can now be controlled by the two half-bridges by suitable triggering of the controllable semiconductor valves. The voltages of the used buffer capacitors are relevant in this respect for the voltage conditions at the second and third pole connection and are therefore also relevant for the occurring ripple current in the inductors.

It is provided according to a further preferred embodiment of the invention that the second centre point connection is connected via a voltage source to the first pole connection. The second centre point connection is directly connected to the centre point. In order to allow dynamically increasing or reducing the potential of the centre point of the three-pole circuit, the centre point of the converter systems can be connected via a voltage source to the first pole connection. The currents of the three-pole circuit can be controlled without distortions by means of an increase or reduction of the potential even in the case of low potential differences, as occurs in principle in the direct connection of the first pole connection with the centre point of the converter systems.

It is provided in a further embodiment of the rectifier circuit in accordance with the invention that the second and third converter system of the three-pole circuit is arranged with known bidirectional three-level bridge legs, preferably two so-called three-level neutral-point-clamped-converters (3L-NPC), wherein the three-level bridge legs are arranged symmetrically around a centre point branch which is switched in parallel to the three-level bridge legs, and the centre point branch is arranged as two buffer capacitors which are switched in series, and the centre point is provided between the two buffer capacitors, and a neutral connection of the three-level bridge leg is connected to the centre point and the first pole connection, and an AC voltage connection of the three-level bridge leg is provided as the second pole connection and third pole connection of the three-pole circuit. The use of two three-level bridge legs represents an especially advantageous embodiment of the invention because the first converter system is not required in this embodiment and thus the efficiency of the entire rectifier system can be increased and furthermore the control currents can be generated as distortion-free as possible. The control of the control currents can be produced by the known triggering of the controllable semiconductor valves of the three-level bridge leg and the injection current is obtained by the fact that $i_{cp}=i_{h3}+i_{cn}$. The described embodiment provides a bidirectional three-pole circuit.

It is provided according to a further preferred embodiment of the invention that the three-pole circuit is connected with the first pole connection to one respective side of two injection capacitors, which connection forms the centre point of the three-pole circuit, wherein the two other sides of the injection capacitors are connected via a voltage source and form connection points, wherein, originating from the connection points, a current loop with one respective buffer capacitor and one respective pair of controllable semiconductor valves is provided, and the second pole connection and the third pole connection are provided between the respective two controllable semiconductor valves of a pair. The control of the control currents still occurs by suitable triggering of the two half-bridges. In the case of an adequately high amplitude of the voltages of the additional voltage source, the two control currents can be conducted in an essentially distortion-free way as a result of this embodiment.

Claim 18 relates to a method for impressing control currents into a DC output of a rectifier circuit with a three-phase rectifier arrangement of the semiconductor valves, preferably a three-pole bridge rectifier circuit of diodes, wherein an injection current of at least one of the three phases is impressed into a mains input of the rectifier circuit. It is provided in accordance with the invention that the injection current is supplied to a first pole connection of a three-pole circuit, and the control of the injection current and/or the control currents occurs by means of active components, preferably controllable semiconductor valves, in the three-pole circuit, and the rectifier currents in two DC output lines are added the control currents by a second and third pole connection of the three-pole circuit, and are guided at least through one choke arranged on the DC output.

The choke current is composed of the current rectified by the rectifier arrangement and the control currents. The choke smoothes the output current in combination with the output capacitor and provides a constant output voltage. The supply of the injection current only occurs to the phase which would remain currentless due to operation of the six-pulse rectifier circuit and allows generating sinusoidal rectifier input currents in the phase with the mains voltages in the case of respective control, which decreases system perturbations of the rectifier structure. Since the additionally introduced three-pole circuit only processes a fraction of the power of the entire rectifier circuit, a substantially better efficiency can be achieved in comparison with conventional active rectifier circuits with low perturbation. In particular, the method in accordance with the invention allows the possibility to expand conventional rectifier circuits and to operate them with the expansion with low perturbation on the mains. It is similarly possible to operate a variable load at the DC output in that the control currents are controlled depending on the load with known triggering of the active components.

It is provided according to a further preferred embodiment of the invention that the injection current and/or the control currents are conducted through at least two of three inductors, provided on at least two of the three pole connections for smoothing and controlling the currents, by differential voltages via the inductors, and the third current is set by means of control of two of the three currents.

The method in accordance with the invention allows operating rectifier circuits with low system perturbations. The supplied control currents and the injection current are smoothed at first by the inductors without receiving pulsating currents from the rectifier arrangement at the output. Large capacitors, which are conventionally provided in generic rectifier circuits for filtering the pulses of the rectifier currents and potential injection currents, are thus avoided. Furthermore, the differential voltage via the inductors forms the base in order to conduct currents through the inductors and thus into the three-pole circuit and out of the same. The total current of the currents at the pole connections of the three-pole circuit of the rectifier circuit in accordance with the invention results in zero. High-frequency switching processes of the active components in the three-pole circuit lead to high-frequency movements of a centre point voltage, especially when all three currents at the pole connections are controlled. By using additional bypass capacitors, an additional high-frequency current path can be provided. It is provided in the present embodiment however that two of the three currents at the pole connections are controlled by means of active components in the three-pole circuit, wherein the third current results in zero as a result of the total current.

According to a further preferred embodiment of the method in accordance with the invention, it is provided that a centre point voltage is measured between the centre point of the three-pole circuit and a neutral point and a mean value of the centre point voltage is controlled by one of the converter systems. The measurement and filtering of the centre point voltage, wherein the centre point voltage is measured with respect to the neutral point (ground) of the mains, allows the active control of this potential, which leads to advantages in the generation of the control currents and the injection current because this potential co-determines the control currents and the injection current. In this process, the potential difference, especially that between the centre point and the DC output lines and the mains input, is controlled by means of the active components in the three-pole circuit.

It is provided in a further preferred embodiment of the invention that the first buffer capacitor voltage at the buffer capacitor is controlled to be greater than a voltage of the positive output line against a neutral point, and a second buffer capacitor voltage at the buffer capacitor is controlled to be lower than a voltage of the negative output line against the neutral point. The buffer capacitor voltages determine the differential voltages at the inductors of the pole connections during switching of the controllable semiconductor valves.

It is provided according to a further preferred embodiment that the control of the mean value of the centre point voltage occurs by means of the semiconductor valves. It is provided according to a preferred embodiment of the invention that the mean value of the centre point voltage is controlled to zero.

As a result of the fact that the sum total of all three currents of the three-pole circuit mandatorily must result in zero, it is sufficient if only two converter systems are used for controlling the control currents and the injection current because the third current is obtained mandatorily. As a result, the remaining converter system can advantageously be used to control the centre point voltage on average. The mean value of the centre point voltage must be used due to the time modulation (therefore switching) of the controllable semiconductor valves. The mean value of the centre point voltage can be controlled by means of the active components in the three-pole circuit. The methods for triggering the active components or the change in its switching states are known. If the centre point voltage is controlled on average to zero with respect to the neutral point of the mains, the amounts of the respective voltages at the buffer capacitors must be greater or lower than those that can accordingly be impressed on the DC output lines against this centre point.

It is provided according to a further embodiment of the method in accordance with the invention that a first buffer capacitor voltage is minimised at the buffer capacitor and a second buffer capacitor voltage is minimised at the buffer capacitor, wherein the centre point voltage is controlled to the negative half value of an injection voltage, and the injection voltage is applied between the first pole connection and the neutral point. The voltages of the two buffer capacitors are minimised in this process, wherein the centre point voltage needs to be controlled in a diametrically opposed manner in relation to the voltage occurring at the first pole connection of the three-pole circuit against the neutral point. This requires a bidirectional arrangement of the first converter stage according to claim 15 because the current and voltage of this converter system are not in phase in this embodiment.

It is provided in a further preferred embodiment of the method in accordance with the invention for rectifier circuits according to claim 11 or 17 that the potential of the centre point voltage is increased or decreased in relation to one of the two output lines by means of the control of the voltage source. This is provided in order to obtain sufficiently large potential differences for controlling the control currents at the pole connections. A distortion-free conduction of the control currents and the injection current can thus be ensured, which subsequently leads to distortion-free input currents of the rectifier circuit.

BRIEF DESCRIPTION OF THE DRAWINGS

The invention will be explained below in closer detail by reference to embodiments shown in the enclosed drawings, wherein:

FIG. 4a shows the curve of the three-phase mains currents at the mains input of the rectifier circuit in accordance with the invention according to FIG. 4;

FIG. 4b shows the curve of the output voltage and a rectified voltage at the DC output of a rectifier circuit in accordance with the invention according to FIG. 4;

FIG. 4c shows the curve of a positive rectifier current of the rectifier circuit in accordance with the invention according to FIG. 4;

FIG. 4d shows the curve of an injector current of the rectifier circuit in accordance with the invention according to FIG. 4;

FIG. 4e shows the curve of a negative rectifier current of the rectifier circuit in accordance with the invention according to FIG. 4;

FIG. 4f shows the curve of a choke current of a rectifier circuit in accordance with the invention according to FIG. 4;

FIG. 4g shows the curve of a control current of a rectifier circuit in accordance with the invention according to FIG. 4;

FIG. 4h shows the curve of a control current of a rectifier circuit in accordance with the invention according to FIG. 4;

DETAILED DESCRIPTION OF THE PREFERRED EMBODIMENTS

Figure 1:
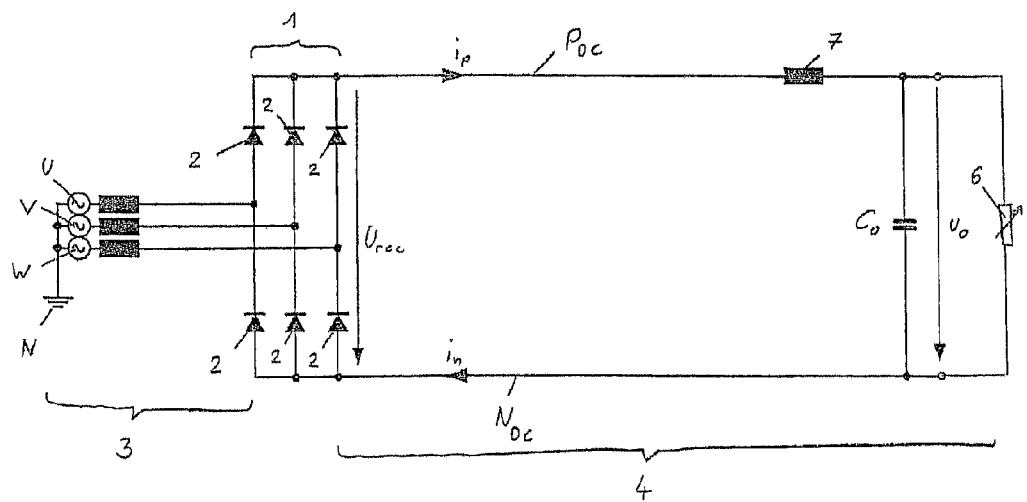
FIG. 1 shows a conventional embodiment of a rectifier circuit with a choke.

FIG. 1 shows a known rectifier circuit with a rectifier arrangement 1 of semiconductor valves 2, a (six-pulse) bridge rectifier arrangement with diodes and with a DC choke 7. The rectifier circuit comprises a mains input 3 and a DC output 4, wherein the phases U, V, W are arranged on the mains input 3, and a positive output line $P_{DC}$ and a negative output line $N_{DC}$ at the DC output 4. A rectified voltage $U_{rec}$ is applied to the rectifier arrangement 1, wherein a constant output voltage $U_0$ is produced at the output.

FIG. 1 shows a neutral point N (the ground potential of the mains) on the mains side. A load 6, which is represented as a variable resistor, is connected at the DC output 4 to the output lines $P_{DC}$, $N_{DC}$, which load consumes a time-variable power $P_o(t)$. Furthermore, an output capacitor $C_0$ is further usually provided at the DC output between the output lines $P_{DC}$, $N_{DC}$. The load 6 is not shown in the further drawings because the connection occurs at the same point as in FIG. 1. The load 6 can also be a further electronic circuit such as a further current converter, wherein the illustrated rectifier circuit is then used as a so-called voltage-link rectifier. The entire power of the load 6 is transported via the choke 7 from the mains to the rectifier output, wherein the half-waves of the output voltage which are typical for the illustrated three-phase diode bridge with semiconductor valves 2 are smoothed by a choke 7 in combination with an output capacitor $C_0$.

The rectifier circuit shown in FIG. 1 shows a disadvantageous configuration with respect to system perturbations. Depending on the dimensioning of the arranged choke 7, the rectifier circuit shows more or less pulsed input currents with currentless gaps at the mains input 3, therefore causing undesirable system perturbations, wherein a potentially required THDi of the input currents cannot be achieved in most cases.

Figure 2:
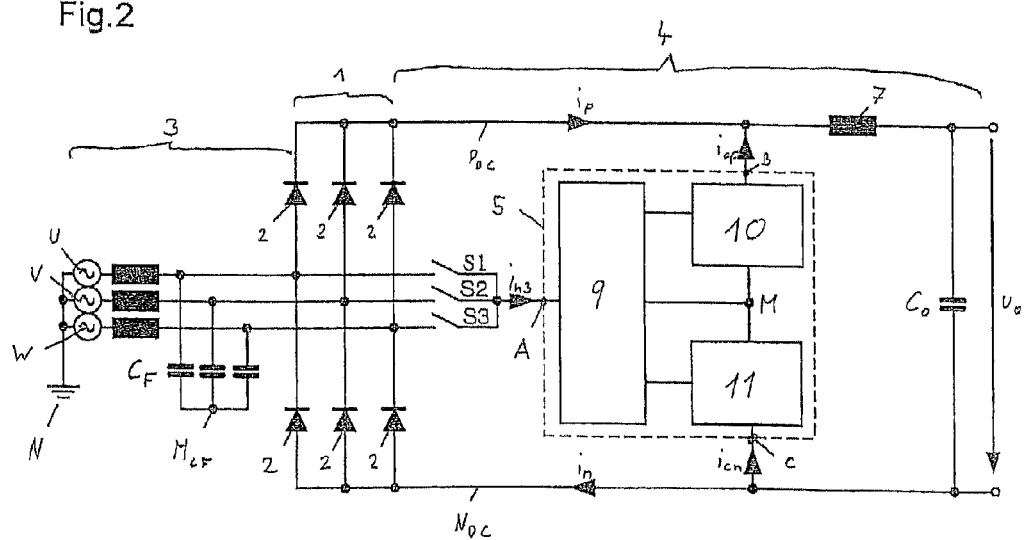
FIG. 2 shows a preferred embodiment of a rectifier circuit in accordance with the invention with three converter systems.
Figure 3:
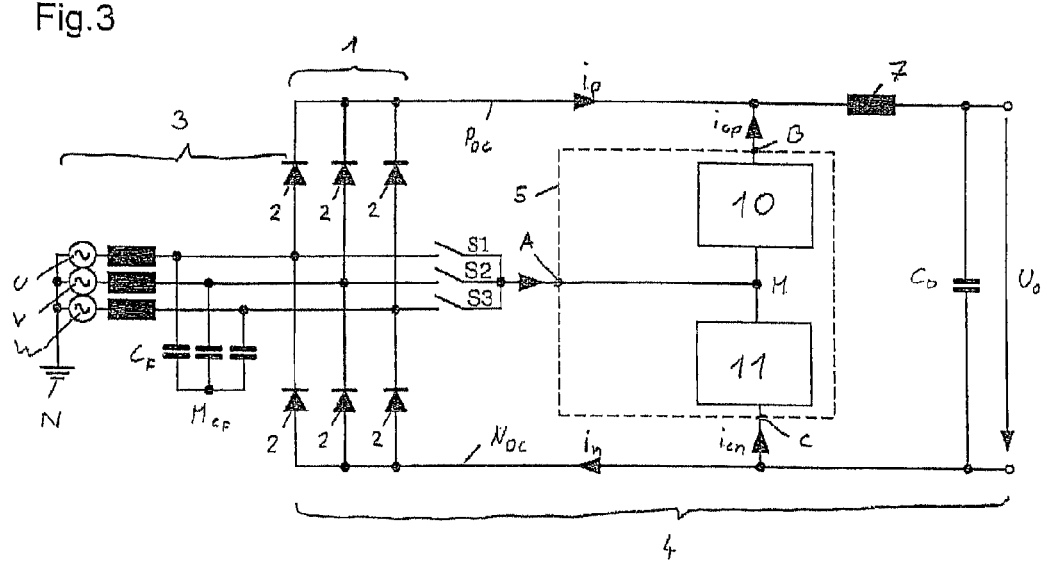
FIG. 3 shows a preferred embodiment of a rectifier circuit in accordance with the invention with two converter systems.

In order to improve THDi, a rectifier circuit in accordance with the invention is provided according to FIG. 2 and FIG. 3. The rectifier circuit in accordance with the invention with a rectifier arrangement 1 additionally comprises a three-pole circuit 5. The three-pole circuit 5 comprises a first pole connection A, a second pole connection B, and a third pole connection C. The first pole connection A is connectable at the mains connection with the switching elements $S_1$,$S_2$,$S_3$ to at least one phase U, V, W each. The second pole connection B is connected to the positive output line $P_{DC}$, which occurs before the choke 7 produces the connection to the load 6. The third pole connection C is connected to the negative output line $N_{DC}$.

In FIG. 2, a rectifier circuit in accordance with the invention is shown with a first converter system 9, a second converter system 10 and a third converter system 11. The three-pole circuit 5 is composed of the converter systems 9, 10, 11, wherein the first converter system 9 is connected to the pole connection A, a second converter system 10, a third converter system 11, and a centre point M. The second converter system 10 is connected to the pole connection B and the centre point M, wherein the third converter system 11 is connected to the pole connection C and the centre point M. At least two of the converter systems 9, 10, 11 comprise controllable semiconductor valves $S_{cp+}$,$S_{cp-}$,$S_{cn+}$,$S_{cn-}$ for the active control of control currents $i_{cp}$,$i_{cn}$ and/or an injection current $i_{h3}$. The first converter system 9 is arranged as a unidirectional or bidirectional three-level bridge leg, wherein the second and the third converter system 10, 11 are arranged as half-bridges.

FIG. 3 shows a rectifier circuit 1 in accordance with the invention with a second converter system 10 and a third converter system 11. A first converter system 9 is not provided. Instead, the first pole connection A is connected directly to the centre point M. The converter systems 10, 11 comprise controllable semiconductor valves $S_{cp+}$,$S_{cp-}$,$S_{cn+}$,$S_{cn-}$ for the active control of control currents $i_{cp}$,$i_{cn}$ and/or an injection current $i_{h3}$.

The switching elements $S_1$,$S_2$,$S_3$ are used to respectively connect one phase U, V, W to the pole connection A of the three-pole circuit 5, wherein a current path is provided for the one injection current $i_{h3}$. The control currents $i_{cp}$,$i_{cn}$ flow to the DC output 4 via the pole connections B, C. System perturbations are avoided at the mains input 3 by the impression of the injection current $i_{h3}$. The injection current which is necessary for the sinusoidal input currents is composed (as shown in FIGS. 4a to 4c) of sections of the desired sinusoidal input currents and shows an approximately triangular curve as shown in FIG. 4d.

Figure 4:
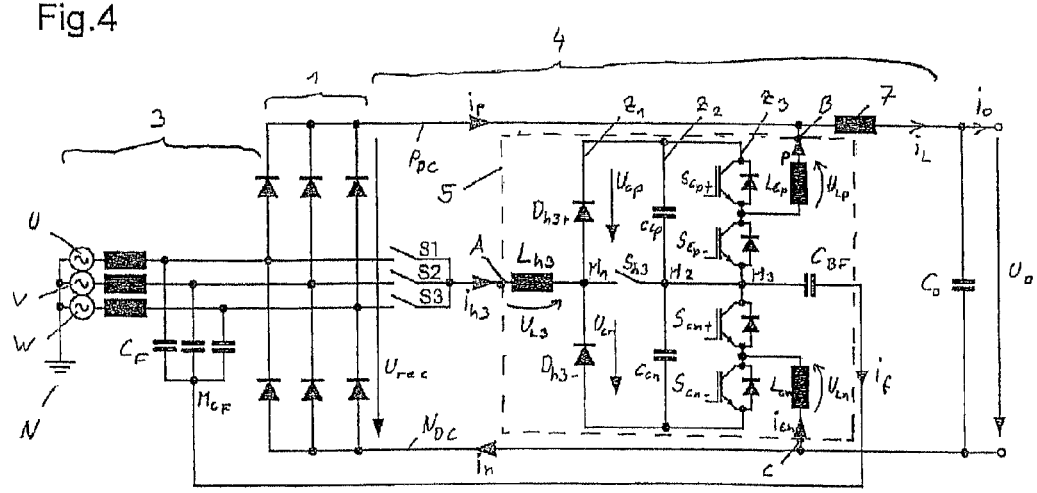
FIG. 4 shows a preferred embodiment of a rectifier circuit with choke in accordance with the invention.

The three-pole circuit 5 according to the preferred embodiment of a rectifier circuit in accordance with the invention according to FIG. 4 uses a unidirectional three-level bridge leg consisting of the two rectifier diodes $D_{h3+}$ and $D_{h3-}$ on a first branch $Z_1$ and a bidirectional switch $S_{h3}$ from a first centre point connection $M_1$ to a second centre point connection $M_2$ for implementing the first converter system 9, wherein the diodes $D_{h3+}$,$D_{h3-}$ connect the first centre point connection $M_1$ to the positive and negative connections of the buffer capacitors $C_{CP}$,$C_{CN}$, which buffer capacitors are provided on the second branch $Z_2$. As a result of the bidirectional switch $S_{h3}$, the first centre point connection $M_1$ is connected to the second centre point connection $M_2$ by activating the bidirectional switch $S_{h3}$ und and thus also to the centre point M of the three-pole circuit 5 via a conductive connection. The second converter system 10 and the third converter system 11 are provided by the two half-bridges with the four controllable semiconductor valves $S_{cp+}$,$S_{cp-}$,$S_{cn+}$,$S_{cn-}$, wherein the positive and negative connections of the two half-bridges are connected to the buffer capacitors $C_{CP}$,$C_{CN}$. The semiconductor valves $S_{cp+}$,$S_{cp-}$, $S_{cn+}$,$S_{cn-}$ are provided on a third branch $Z_3$. The arrangement of such an interconnection of controllable semiconductor valves $S_{cp+}$,$S_{cp-}$,$S_{cn+}$,$S_{cn-}$ is especially possible with a known so-called "three-level topology" of IGBTs with a freewheeling diodes which are available on the market and thus easy to realise at low cost, wherein a centre point M is also provided. The buffer capacitors $C_{CP}$,$C_{CN}$ are both a component of the three-level bridge leg of the first converter system 9 and also the half-bridges of the second and third converter system 9, 10. The pole connections B and C of the three-pole circuit are provided between one respective first pair $S_{cp+}$,$S_{cp-}$ and a second pair $S_{cn+}$,$S_{cp-}$ of controllable semiconductor valves. The currents $i_{h3}$,$i_{cp}$,$i_{cn}$ can be controlled through suitable triggering of the controllable semiconductor valves $S_{cp+}$,$S_{cp-}$,$S_{cn+}$,$S_{cn-}$ of the two half-bridges and the three-level bridge leg.

Furthermore, the preferred embodiment of the rectifier circuit in accordance with the invention according to FIG. 4 comprises filter capacitors $C_F$ which are arranged in a point-to-point connection and are connected at the mains input 3 to the phases U, V, W. The filter capacitors $C_F$ are arranged in a point-to-point connection around the star point $M_{CF}$. The star point $M_{CF}$ is further connected to a bypass capacitor $C_{BF}$ with a centre point M of the three-pole circuit 5. This connection of the mains input 3 with a bypass capacitor $C_{BF}$ via the filter capacitors $C_F$ allows the discharge of the high-frequency fault currents $i_f$, which are produced by the high-frequency switching processes in the three-pole circuit 5, which leads to special advantages when all three currents $i_{h3}$, $i_{cp}$, and $i_{cn}$ of the three-pole circuit 5 are controlled by a separately arranged controller. The connection of the bypass capacitor $C_{BF}$ is not regarded as a further fourth pole connection of the three-pole circuit 5 because the discharged fault currents $i_f$ are high-frequency and comparatively low in relation to the currents in the pole connections A, B, C.

Each of the pole connections A, B, C is connected according to a preferred embodiment in FIG. 4 to an inductor $L_{h3},L_{cp},L_{cn}$, which are used for guiding the two control currents $i_{cp}, i_{cn}$ and the injection current $i_{h3}$. At least two of the three injection currents $i_{h3},i_{cp},i_{cn}$ are controlled in this manner, wherein the third current results in zero as a result of the mandatory total current.

FIG. 4a shows the current curve of the phases U, V, W at the mains input 3. The phase currents $i_u,i_v,i_w$ are phase-shifted according to a three-phase mains.

FIG. 4b shows the rectified voltage $U_{rec}$ which is applied between the two output lines $P_{DC}$, $N_{DC}$ after the rectifier circuit 1. The rectified voltage $U_{rec}$ comprises sinusoidal crests in addition to an output voltage $U_0$. A constant output voltage $U_0$ is achieved by filtering of the rectified voltage $U_{rec}$ with the choke 7 and the output capacitor $C_0$.

FIG. 4c shows the curve of a positive rectifier current $i_p$, which is obtained by suitable supply of a control current $i_{cp}$ to the positive output line $P_{DC}$ of the bridge rectifier. The illustrated sine crests correspond to the respective sections of the sinusoidal input currents $i_u,i_v,i_w$.

FIG. 4d shows the injection current $i_{h3}$, which corresponds to the triangular components of the mains currents $i_u,i_v,i_w$. Said injection current $i_{h3}$ is supplied to the three-pole circuit 5 by the rectifier circuit in accordance with the invention.

The choke current $i_L$ is shown in FIG. 4f and comprises a constant output current $i_0$ which is supplied directly to the load 6, and a superimposed alternating component which is obtained as a result of the voltage difference between the rectifier output voltage $U_{rec}$ and the approximately constant output voltage $U_0$. The curve of the required control currents $i_{cp}, i_{cn}$ is shown in FIGS. 4g and 4h. The control currents $i_{cp}, i_{cn}$ of must preferably be controlled according to FIG. 4g and FIG. 4h.

According to a further embodiment, a second and third converter system 9, 10 of the three-pole circuit 5 can be provided. The first converter system 9 is connected by direct connection to the pole connection A via the centre point M. As already described in FIG. 4, the second and third converter system 10, 11 is advantageously arranged by half-bridges with controllable semiconductor valves $S_{cp+},S_{cp-}$, $S_{cn+},S_{cn-}$ and buffer capacitors. The potential of the centre point M is defined by the direct connection of the centre point M with the pole connection A of the three-pole circuit 5 and shows no high-frequency voltage jumps. In this process, the two control currents $i_{cp},i_{cn}$ are controlled by suitable triggering of the controllable semiconductor valves of the two half-bridges, wherein the injection current $i_{h3}$ is obtained on the basis of the total current of zero of the three-pole circuit 5. A connection of the three-pole circuit 5 by means of the bypass capacitor $C_{BF}$ back to mains is not provided according to the embodiment of the rectifier circuit according to FIG. 3.

Figure 5:
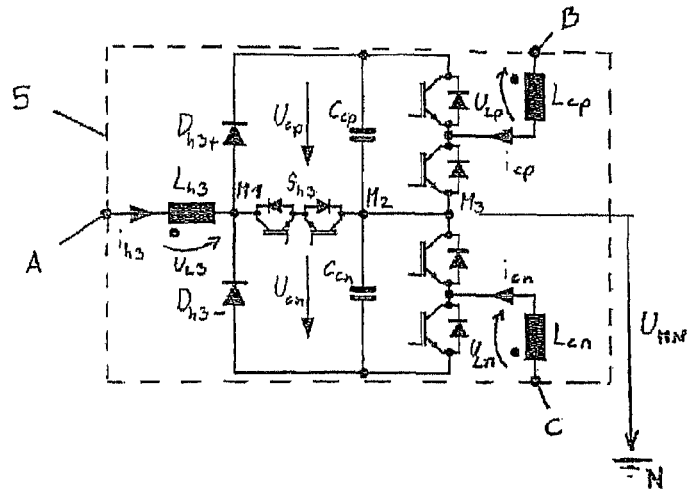
FIG. 5 shows an embodiment of the three-pole circuit of the rectifier circuit with choke in accordance with the invention.

FIG. 5 shows an advantageous embodiment of the three inductors $L_{h3},L_{cp},L_{cn}$ with a three-leg choke, wherein the winding direction is entered by points on the individual chokes, which advantageously leads to a relevant reduction in the overall volume and weight of the magnetic components and therefore the entire rectifier system in accordance with the invention.

Furthermore, FIG. 5 shows an embodiment of the bidirectional switch $S_{h3}$ of a unidirectional three-level bridge leg of the first converter system 9 of a three-pole circuit 5, in which two IGBTs with antiparallel freewheeling diodes switched against each other are used, wherein other switching elements such as MOSFETs can be used alternatively. This embodiment of bidirectional switches $S_{h3}$ is known, but shall be explained here in connection with the rectifier circuit in accordance with the invention, wherein the control of a centre point voltage $U_{MN}$ shall be explained with respect to the integrated view of the bidirectional switch $S_{h3}$ with the rectifier circuit in accordance with the invention and the method in accordance with the invention for impressing control currents.

Figure 6:
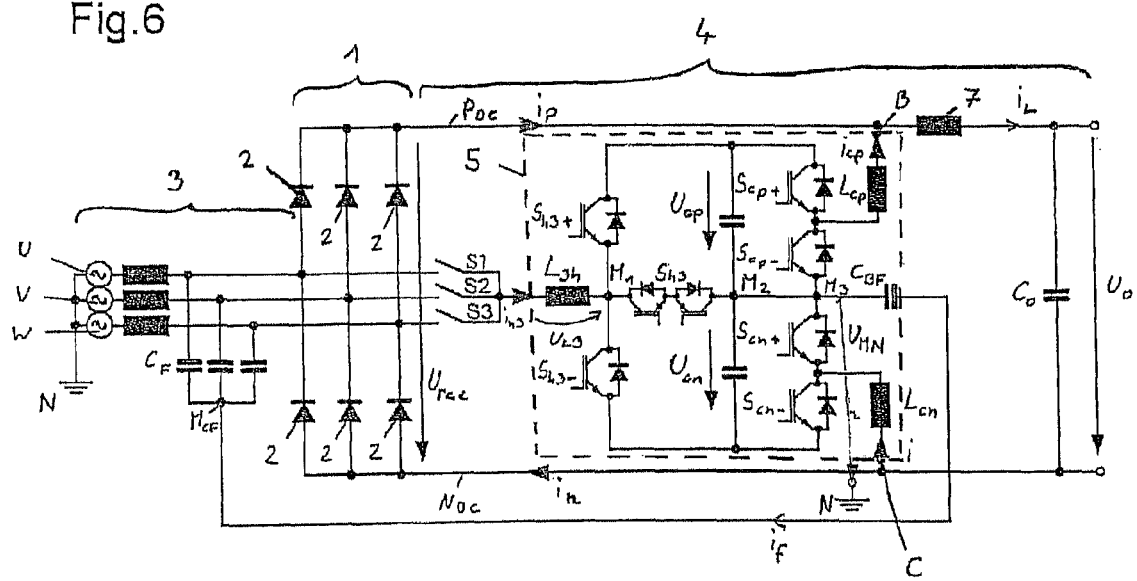
FIG. 6 shows a further preferred embodiment of a rectifier circuit with choke in accordance with the invention.

The centre point voltage $U_{MN}$, which is shown in FIG. 5 and FIG. 6, influences the generation of differential voltages $U_{L3},U_{Lp},U_{Ln}$ via the inductors $L_{h3},L_{cp},L_{cn}$ in order to control the control currents and/or the injection current. The first differential voltage $U_{L3}$ is obtained by the first inductor $L_{h3}$ et cetera. An injection voltage $U_{h3}$ is obtained from the potential of the first pole connection A in relation to mains, i.e. in relation to the neutral point N.

Possibilities for controlling the impression of control currents in accordance with the invention will be explained below:

All three currents $i_{h3},i_{cp},i_{cn}$ are controlled simultaneously with three converter systems 9, 10, 11 to a desired curve. Control of the centre point voltage $U_{MN}$ is not possible because all degrees of freedom of the rectifier circuit in accordance with the invention are already used for the control. In the case of any occurring control errors, potential jumps of the centre point voltage $U_{MN}$ occur which can be captured advantageously by an arrangement with the bypass capacitor $C_{BF}$.

Only two of the three currents $i_{h3},i_{cp},i_{cn}$ are controlled by the respective converter systems 9, 10, 11, wherein the converter system 9 controls the injection current $i_{h3}$ and the converter system 10 the control current $i_{cp}$ for example. As a result of the principal fact that the total current of the three-pole circuit is zero, the third converter system 11 is advantageously used to control the mean value of the centre point voltage $U_{MN}$.

Figure 6A:
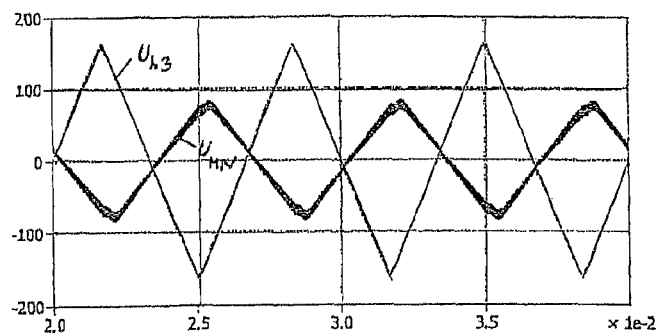
FIG. 6a shows the curve of the mean value of a centre point voltage of the rectifier circuit in accordance with the invention according to FIG. 6 in the case of impression of a control current in accordance with the invention.

According to a further preferred embodiment, a minimisation of the buffer capacitor voltages $U_{cp},U_{cn}$ is possible in that the mean value of the centre point voltage $U_{MN}$ is controlled in a diametrically opposite way to the injection voltage $U_{h3}$ which occurs at the first pole connection A of the three-pole circuit 5. Only two of the three currents $i_{h3},i_{cp},i_{cn}$ are controlled again by the respective converter system 9, 10, 11, wherein the converter system 11 controls the injection current $i_{h3}$ and the converter system 9 the control current $i_{cp}$, wherein the third converter system 10 is then used for controlling the mean value of the centre point voltage $U_{MN}$. FIG. 6a shows by way of example such a mean value of the centre point voltage $U_{MN}$ which is control in a diametrically opposed manner in relation to the voltage at the first pole connection A of the three-pole circuit 6, wherein FIG. 6a only shows the centre point voltage which is averaged over a switching period of the semiconductor valves $S_{cp+},S_{cp-},S_{cn+},S_{cn-},S_{h3},S_{h3+}$, $S_{h3-}$.

Whereas the first converter system 9 can be arranged with a unidirectional three-level bridge leg for the first two control methods, it is mandatory to provide a bidirectional arrangement of the three-level bridge leg of the first converter system 9 for the third control method.

FIG. 6 shows a preferred embodiment of the three-pole circuit 5 with a bidirectional three-level bridge leg in the first converter system 9. In this case, the rectifier diodes $D_{h3+}$, $D_{h3-}$ in the first branch $Z_1$ are replaced, as shown in FIG. 4, by active controllable semiconductor components $S_{h3+}, S_{h3-}$, e.g. by IGBTs with antiparallel freewheeling diodes as shown in FIG. 6. As a result, currents can also be impressed in anti-phase to the injection voltage $U_{h3}$ at the first pole connection A of the three-pole circuit 5.

Figure 7:
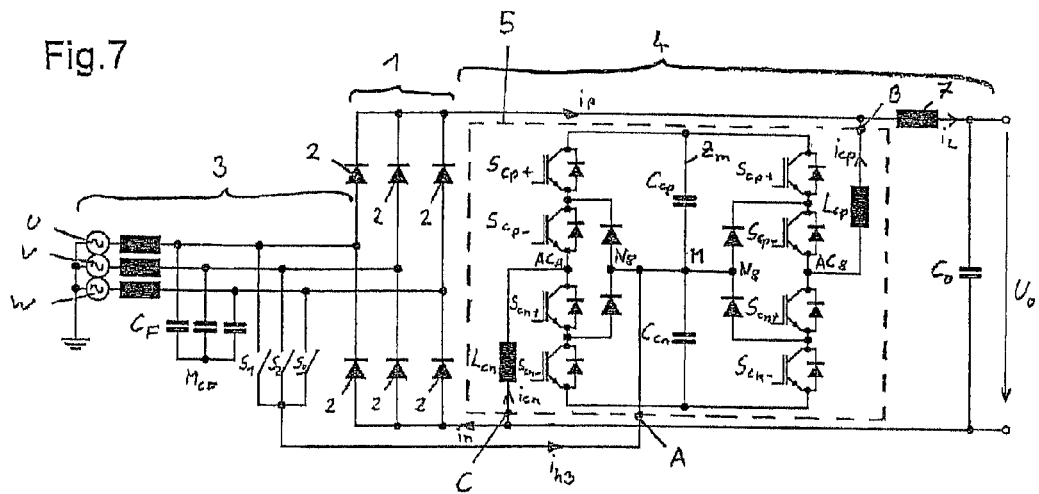
FIG. 7 shows a further preferred embodiment of a rectifier circuit with choke in accordance with the invention.

FIG. 7 shows an embodiment of the rectifier circuit in accordance with the invention, wherein the first converter system 9 is replaced by a direct connection of the first pole connection A with the centre point M of the three-pole circuit 5, and both the second converter system 10 and also the third converter system 11 are arranged by a three-level bridge leg, wherein in FIG. 7 the generally known Three-Level Neutral-Point-Clamped-Converter 3L-NPC is arranged, wherein bridge legs of the same kind can be used. The two three-level bridge legs are respectively arranged in a symmetrical fashion about a centre point branch $Z_m$, wherein the centre point branch is connected to the DC voltage connections of the three-level bridge legs. The centre point branch $Z_m$ is provided with buffer capacitors $C_{CP}, C_{CN}$ and directly connected in a connectable manner via switching elements $S_1, S_2, S_3$ at the centre point M of the centre point branch $Z_m$ to mains input 3. A neutral connection $N_8$ of the three-level bridge legs is connected to the centre point M and the first pole connection A. An AC voltage connection $AC_8$ of the 3L-NPC is respectively connected via the inductors $L_{cp}, L_{CN}$ to the pole connections B, C. In this embodiment, the control currents $i_{cp}, i_{cn}$ are controlled by suitable triggering of the semiconductor valves $S_{cp+}, S_{cp-}, S_{cn+}, S_{cn-}$ of the three-level bridge legs, wherein the injection current $i_{h3}$ is obtained automatically. Since the centre point M is connected directly via the switches S1, S2, S3 to the mains phases U, V, W, a control of the medium voltage $U_{MN}$ can be omitted. Since the control currents $i_{cn}, i_{cp}$ have both a positive and also negative sign in the case of a constant positive or negative voltage level at the centre point M, bidirectional bridge structures must be used in both converter systems 10, 11.

Figure 8:
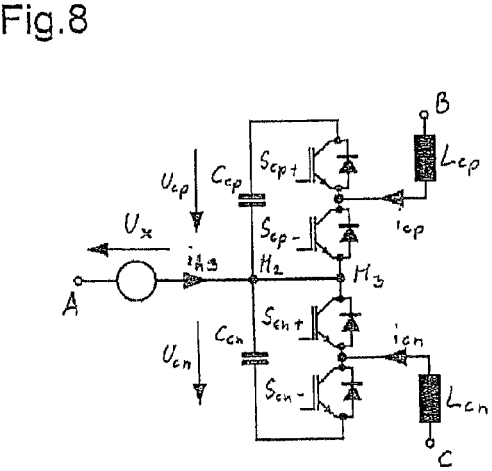
FIG. 8 shows a further embodiment of the three-pole circuit of the rectifier circuit with choke in accordance with the invention.

FIG. 8 shows a further embodiment of the three-pole circuit 5, wherein a voltage source $U_x$ is additionally provided at the current branch of the injection current $i_{h3}$. The control currents $i_{cp}, i_{cn}$ are controlled by suitable triggering of the controllable semiconductor valves $S_{cp+}, S_{cp-}, S_{cn+}, S_{cn-}$ of the converter systems 10, 11, wherein the injection current $i_{h3}$ is obtained automatically. The voltage source $U_x$ impresses in accordance with the invention a time-variable voltage into the branch between the pole connection A and the centre point M of the three-pole circuit 5, which voltage allows an increase or decrease of the centre point voltage $U_{MN}$ and a lower-distortion conduction of the control currents $i_{cp}, i_{cn}$.

Figure 9:
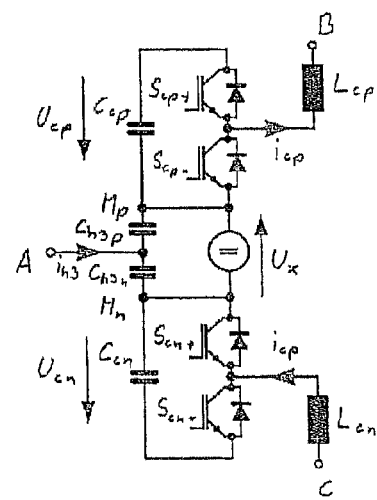
FIG. 9 shows a further embodiment of the three-pole circuit of the rectifier circuit with choke in accordance with the invention.

FIG. 9 shows a further embodiment of a three-pole circuit 5 with a voltage source $U_x$ which is provided between the second and third converter system 10, 11 of the three-pole circuit, wherein the voltage source $U_x$ according to FIG. 9 concerns a DC voltage source. Two injection capacitors $C_{h3p}, C_{h3n}$ are provided parallel to the voltage source, whose connection is connected to the pole connection A of the $C_{h3p}, C_{h3n}$. The control currents $i_{cp}, i_{cn}$ are controlled by suitable triggering of the controllable semiconductor valves $S_{cp+}, S_{cp-}, S_{cn+}, S_{cn-}$, wherein the injection current $i_{h3}$ is automatically obtained with zero as a result of the total current. As a result of the additionally inserted voltage source $U_x$, the negative potential of the second converter system 10 is advantageously reduced and the potential of the positive connection of the third converter system 11 is advantageously increased, which subsequently allows a substantially distortion-free conduction of the two control currents $i_{cn}, i_{cp}$.

This immediately shows that a rectifier circuit with current injection and a method for impressing control currents were improved in such a way that low system perturbations of the rectifier circuit occur, wherein an input current which is as sinusoidal as possible is to be present in phase with the respective mains voltages, no large magnetic components are required on the AC voltage side of the rectifier circuit, pulsed injection of the control current at the output of the rectifier circuit is avoided, no large filter capacitors arranged on the AC voltage or DC voltage sides are required, and the efficiency of the rectifier circuit is improved.

LIST OF REFERENCE NUMERALS

1 Rectifier arrangement
2 Semiconductor valve
3 Mains input
4 DC output
5 Three-pole circuit
6 Load
7 Choke
A First pole connection
$AC_8$ AC voltage connection
B Second pole connection
C Third pole connection
$C_0$ Output capacitor
$C_{BF}$ Bypass capacitor
$C_F$ Filter capacitor
$C_{cp}$ Buffer capacitor
$C_{cn}$ Buffer capacitor
$C_{h3p}$ Injection capacitor
$C_{h3n}$ Injection capacitor
$D_{h3+}$ Bridge valve
$D_{h3-}$ Bridge valve
$i_{h3}$ Injection current
$i_{cn}$ Control current
$i_{cp}$ Control current
$i_L$ Choke current
$i_p$ Positive rectifier current
$i_n$ Negative rectifier current
$i_f$ Fault current
$i_u$ Phase current
$i_v$ Phase current
$i_w$ Phase current
$L_{h3}$ First inductor
$L_{cp}$ Second inductor
$L_{cn}$ Third inductor
$M_1$ First centre point connection
$M_2$ Second centre point connection
$M_3$ Third centre point connection
M Centre point
$M_{CF}$ Star point
$M_p$ Connection point
$M_n$ Connection point
N Neutral point
$N_8$ Neutral connection
$N_{DC}$ Negative output line
$P_{DC}$ Positive output line
$P_0(t)$ Time-variable power
$S_1$ Switching element
$S_2$ Switching element
$S_3$ Switching element
$S_{cp+}$ Controllable semiconductor valve
$S_{cp-}$ Controllable semiconductor valve $S_{cn+}$ Controllable semiconductor valve
$S_{cn-}$ Controllable semiconductor valve
$S_{h3+}$ Controllable semiconductor valve
$S_{h3-}$ Controllable semiconductor valve
$S_{h3}$ Bidirectional switch
U Phase
$U_x$ Voltage source
$U_0$ Output voltage
$U_{rec}$ Rectified voltage
$U_{Lp}$ First differential voltage
$U_{Ln}$ Second differential voltage
$U_{L3}$ Third differential voltage
$U_{h3}$ Injection voltage
$U_{cp}$ Buffer capacitor voltage
$U_{cn}$ Buffer capacitor voltage
$U_{MN}$ Centre point voltage
V Phase
W Phase
$Z_1$ First branch
$Z_2$ Second branch
$Z_3$ Third branch
$Z_m$ Centre point branch

The invention claimed is:

1. A rectifier circuit with a three-phase rectifier arrangement of semiconductor valves, preferably a bridge rectifier circuit of diodes, wherein the rectifier arrangement comprises a three-phase mains input and a DC output, and at least one of the three phases at the mains input is connected to a first pole connection of a three-pole circuit for diverting an injection current into the three-pole circuit, wherein each phase can respectively be connected with a switching element to the first pole connection of the three-pole circuit, and a second and third pole connection of the three-pole circuit is respectively connected to an output line of the DC output for control currents, wherein the three-pole circuit comprises controllable semiconductor valves, preferably IGBTs, for the active control of the control currents and/or the injection current, and at least one choke is arranged on one of the output lines at the DC output, and a time-variable load is provided at the DC output, and wherein the second and third pole connection of the three-pole circuit are respectively connected via a second and third inductor to one of the two output lines of the DC output, and the choke is provided between the second or third pole connection and the load.

2. The rectifier circuit according to claim 1, wherein the first pole connection is connected to the switching elements via a first inductor, wherein the three inductors are arranged via a three-leg choke.

3. The rectifier circuit according to claim 1, wherein the two output lines at the DC output are connected to an output capacitor.

4. The rectifier circuit according to claim 1, wherein each of the three phases at the mains input is respectively connected to a filter capacitor, and wherein the filter capacitors are interconnected in a point-to-point manner in a star point.

5. The rectifier circuit according to claim 1, wherein the three-pole circuit is connected via at least one bypass capacitor to the mains input.

6. The rectifier circuit according to claim 1, wherein the three-pole circuit comprises three converter systems with controllable semiconductor valves and/or a bidirectional switch, preferably arranged in a bridge structure, wherein the first pole connection of the three-pole circuit is provided on a first converter system, the second pole connection of the three-pole circuit on a second converter system, and the third pole connection of the three-pole circuit on a third converter system, and a connection to a branching point, i.e. a common center point of the three-pole circuit, is provided from all three converter systems.

7. The rectifier circuit according to claim 6, wherein the first converter system is provided as a three-level bridge leg, wherein the second and third converter system are provided as a half-bridge, and the three converter systems are arranged via three branches which are switched in parallel and are provided with electronic components, wherein the first pole connection of the three-pole circuit is arranged on a first branch, and the second and third pole connection are arranged on a third branch, and each of the branches comprises a center point connection, wherein the components of the branches are arranged symmetrically around said center point connections, and wherein a first center point connection of the first branch is connected via a bidirectional switch to a second center point connection of the second branch, and the second center point connection is directly conductively connected to a third center point connection of the third branch, wherein the third center point connection is provided as the center point of the three-pole circuit.

8. The rectifier circuit according to claim 7, wherein two bridge valves, preferably diodes, are switched in the first branch in series with the same conducting direction, and wherein the first center point connection is arranged between the two bridge valves.

9. The rectifier circuit according to claim 8, wherein the two bridge valves are arranged as controllable semiconductor valves, preferably IGBTs.

10. The rectifier circuit according to claim 7, wherein two buffer capacitors are switched in series on the second branch, and wherein the second center point connection is arranged between the two buffer capacitors.

11. The rectifier circuit according to claim 7, wherein the four controllable semiconductor valves are provided to be switched in series on the third branch, and wherein the center point of the three-pole circuit is arranged in the connection between two pairs of the controllable semiconductor valves which are switched in series, and the second pole connection is provided between the controllable semiconductor valves of the first pair, and the third pole connection is provided between the controllable semiconductor valves of the second pair.

12. The rectifier circuit according to claim 1, wherein the three-pole circuit comprises two converter systems with controllable semiconductor valves, preferably arranged in a bridge structure, wherein the second pole connection of the three-pole circuit is provided on a second converter system, and the third pole connection of the three-pole circuit is provided on a third converter system, and a connection to a branching point, i.e. a common center point of the three-pole circuit, is provided from both converter systems, and the center point is connected to the first pole connection.

13. The rectifier circuit according to claim 12, wherein the second and third converter system are provided as a half-bridge, wherein the two converter systems are arranged via two branches switched in parallel, and the first pole connection of the three-pole circuit is connected to a second branch, and the second and third pole connection are arranged on a third branch, and each of the branches comprises a center point connection, wherein the components of the branches are arranged symmetrically around said center point connections, and a second center point connection of the second branch is directly conductively connected to a third center point connection of the third branch, wherein the third center point connection is provided as the center point of the three-pole circuit.

14. The rectifier circuit according to claim 13, wherein the second center point connection is connected via a voltage source to the first pole connection.

15. The rectifier circuit according to claim 12, wherein the second and third converter system of the three-pole circuit are arranged with known bidirectional three-level bridge legs, preferably two so-called three-level neutral-point-clamped-converters, and wherein the three-level bridge legs are arranged symmetrically around a center point branch which is switched in parallel to the three-level bridge legs, and the center point branch is arranged as two buffer capacitors which are switched in series, and the center point is provided between the two buffer capacitors, and a neutral connection of the three-level bridge leg is connected to the center point and the first pole connection, and an AC voltage connection of the three-level bridge leg is respectively provided as the second pole connection and third pole connection of the three-pole circuit.

16. The rectifier circuit according to claim 12, wherein the three-pole circuit is connected with the first pole connection to one respective side of two injection capacitors, which connection forms the center point of the three-pole circuit, wherein the two other sides of the injection capacitors are connected via a voltage source and form connection points, wherein a current loop is provided which originates from the connection points and comprises one respective buffer capacitor and one respective pair of controllable semiconductor valves, and the second pole connection and the third pole connection are provided between the respective two controllable semiconductor valves of a pair.

17. A method for impressing control currents into a DC output of a rectifier circuit with a three-phase rectifier arrangement of semiconductor valves, preferably a three-pole bridge rectifier circuit of diodes, wherein an injection current is diverted from at least one of the three phases at a mains input of the rectifier circuit, wherein the injection current is supplied to a first pole connection of a three-pole circuit, and the control of the injection current and/or the control currents occurs via active components, preferably controllable semiconductor valves, in the three-pole circuit, and the rectifier currents in two DC output lines are added the control currents via a second and third pole connection of the three-pole circuit, and are guided at least through one choke arranged on the DC output, and wherein the injection current and/or the control currents are conducted through at least two of three inductors, provided on at least two of the three pole connections for smoothing and controlling the currents, by differential voltages via the inductors, and the third current is set via control of two of the three currents.

18. The method for impressing control currents ($i_{cp}, i_{cn}$) according to claim 17, wherein a center point voltage ($U_{MN}$) is measured between the center point of the three-pole circuit and a neutral point, and a mean value of the center point voltage is controlled by one of the converter systems.

19. The method for impressing control currents according to claim 18, wherein the mean value of the center point voltage is controlled to zero.

20. The method for impressing control currents according to claim 18, wherein a first buffer capacitor voltage at the buffer capacitor is controlled to be greater than a voltage of the positive output line against a neutral point, and a second buffer capacitor voltage at the buffer capacitor is controlled to be lower than a voltage of the negative output line against the neutral point.

21. The method for impressing control currents according to claim 18, wherein the control of the mean value of the center point voltage occurs via the controllable semiconductor valves.

22. The method for impressing control currents according to claim 17, wherein a first buffer capacitor voltage is minimized at the buffer capacitor and a second buffer capacitor voltage is minimized at the buffer capacitor, and wherein the center point voltage is controlled to the negative half value of an injection voltage, and the injection voltage is applied between the first pole connection and the neutral point.

23. The method for impressing control currents according to claim 17, wherein the potential of the center point voltage is increased or decreased in relation to one of the two output lines via the control of the voltage source.

* * * * *